US009454734B2

United States Patent
Facemire et al.

(10) Patent No.: US 9,454,734 B2
(45) Date of Patent: Sep. 27, 2016

(54) HEURISTIC ASSEMBLY OF A COMPONENT BASED APPLICATION

(75) Inventors: Michael D. Facemire, Cary, NC (US); Eric L. Masselle, Raleigh, NC (US); Patrick G. McGowan, Chapel Hill, NC (US); Shankar Ramaswamy, Chapel Hill, NC (US); Amber Roy-Chowdhury, Cary, NC (US); Michael Christian Wanderski, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2601 days.

(21) Appl. No.: 11/359,315

(22) Filed: Feb. 21, 2006

(65) Prior Publication Data
US 2007/0198969 A1 Aug. 23, 2007

(51) Int. Cl.
*G06F 9/44* (2006.01)
*G06Q 10/00* (2012.01)

(52) U.S. Cl.
CPC ............. *G06Q 10/00* (2013.01); *G06F 8/36* (2013.01)

(58) Field of Classification Search
CPC ........... G06Q 10/00; G06F 8/36; G06F 8/34; G06F 8/30; G06F 8/20
USPC .......................... 370/395–468; 717/168, 107
See application file for complete search history.

(56) References Cited

U.S. PATENT DOCUMENTS

| | | | |
|---|---|---|---|
| 6,029,141 A * | 2/2000 | Bezos et al. ................... 705/27 |
| 6,058,373 A * | 5/2000 | Blinn et al. ..................... 705/26 |
| 6,167,383 A * | 12/2000 | Henson ............................ 705/26 |
| 6,529,910 B1 * | 3/2003 | Fleskes ............................ 707/10 |
| 6,631,512 B1 * | 10/2003 | Onyeabor ....................... 717/100 |
| 6,704,797 B1 * | 3/2004 | Fields et al. ................... 709/246 |
| 6,957,417 B2 * | 10/2005 | Turner et al. ................. 717/108 |
| 7,168,035 B1 * | 1/2007 | Bell et al. ...................... 715/234 |
| 7,194,473 B1 * | 3/2007 | Hichwa et al. ................ 707/101 |
| 7,281,217 B2 * | 10/2007 | Choudhary et al. ........... 715/764 |
| 7,287,227 B2 * | 10/2007 | Ries et al. ...................... 715/741 |
| 7,526,437 B1 * | 4/2009 | Cue et al. ......................... 705/26 |
| 2002/0087945 A1 | 7/2002 | Marshall et al. |
| 2003/0105974 A1 | 6/2003 | Griffin et al. |
| 2003/0163513 A1 * | 8/2003 | Schaeck et al. .............. 709/201 |
| 2004/0010776 A1 * | 1/2004 | Shah ............................. 717/117 |
| 2004/0015822 A1 * | 1/2004 | Linton et al. ................. 717/104 |

(Continued)

*Primary Examiner* — Anna Deng
(74) *Attorney, Agent, or Firm* — Cuenot, Forsythe & Kim, LLC

(57) ABSTRACT

Embodiments of the present invention address deficiencies of the art in respect to wiring components in a component based application and provide a method, system and computer program product for heuristically assembling components in a component based application. In one embodiment, a data processing system configured to assemble component based applications can include a component aggregation application including an application builder configured to assemble components into a component based application. The system further can include a property broker coupled to the component aggregation application and configured to apply a wiring scheme to selected components in a component based application. Finally, a collaborative heuristic integration matching engine (CHIME) can be coupled to the property broker and a data store of behaviorally derived data, the CHIME including program enabled to suggest components for assembly in a component based application based upon behaviorally derived data in the data store.

12 Claims, 2 Drawing Sheets

(56) References Cited

U.S. PATENT DOCUMENTS

| | | | |
|---|---|---|---|
| 2004/0017395 A1* | 1/2004 | Cook | 345/745 |
| 2004/0090969 A1* | 5/2004 | Jerrard-Dunne et al. | 370/395.54 |
| 2004/0104933 A1 | 6/2004 | Friedrich et al. | |
| 2004/0139104 A1* | 7/2004 | Kuntz-Mayr et al. | 707/103 R |
| 2004/0158829 A1* | 8/2004 | Beresin et al. | 717/178 |
| 2004/0168123 A1* | 8/2004 | Lomelin-Stoupignan et al. | 715/513 |
| 2004/0183831 A1* | 9/2004 | Ritchy et al. | 345/762 |
| 2004/0199369 A1* | 10/2004 | Freidman et al. | 703/19 |
| 2005/0015293 A1 | 1/2005 | Henn et al. | |
| 2005/0015742 A1 | 1/2005 | Wood et al. | |
| 2005/0050021 A1* | 3/2005 | Timmons | 707/3 |
| 2005/0108258 A1* | 5/2005 | Olander et al. | 707/100 |
| 2006/0010390 A1* | 1/2006 | Guido et al. | 715/742 |
| 2006/0064422 A1* | 3/2006 | Arthurs et al. | 707/10 |
| 2006/0165123 A1* | 7/2006 | Jerrard-Dunne et al. | 370/468 |
| 2006/0174195 A1* | 8/2006 | White | 715/522 |
| 2006/0206856 A1* | 9/2006 | Breeden et al. | 717/101 |
| 2006/0242582 A1* | 10/2006 | Swanson et al. | 715/733 |
| 2007/0006083 A1* | 1/2007 | Daniels et al. | 715/742 |
| 2007/0067712 A1* | 3/2007 | Baker et al. | 715/506 |
| 2007/0112913 A1* | 5/2007 | Bales | 709/204 |
| 2007/0124688 A1* | 5/2007 | Nauerz et al. | 715/746 |
| 2008/0183720 A1* | 7/2008 | Brown et al. | 707/10 |

* cited by examiner

HEURISTIC ASSEMBLY OF A COMPONENT BASED APPLICATION

BACKGROUND OF THE INVENTION

1. Field of the Invention

The present invention relates to the field of component based user applications and more particularly to the assembly of different components to produce a component based user application.

2. Description of the Related Art

Component based user applications address the rigid nature of unitary, consolidated applications which are programmed to support a particular application need without providing substantial flexibility. In the unitary, consolidated application, little can be done if the particular application needs change. By comparison, in component based computing, different components provide atomic elements of application functionality. Individual components can be combined with other components to dynamically assemble an application which provides a specific type of functionality to flexibly support a particular application need, even as the application needs change. Examples of component based computing implementations include collaborative computing applications and portal computing environments.

Portal frameworks support a component based model for building user facing applications. Portal applications represent assemblies of user-facing components which can be combined in different ways to produce different applications. Portlets are the visibly active, user-facing components included as part of portal pages. Similar to the graphical windows paradigm of windowing operating systems, each portlet in a portal occupies a portion of the portal page through which the portlet can display associated content from a portlet channel. The prototypical portlet can be implemented as a server-side script executed through a portal server.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

Cooperative portlets subscribe to a model for declaring, publishing and sharing information with one another using a property broker. Portlets can subscribe to the broker by publishing typed data items or properties that can be shared by the portlet, either as a provider or as a recipient. Generally, a portlet that provides a property is referred to as a source portlet, a portlet that receives a property is referred to as a target portlet, the properties published by the source portlet are referred to as output properties, and the properties that are received by a target portlet are referred to as input properties.

Properties can be exchanged among portlets through a persistent connection referred to as a wire. Using the wire, property transfers can be effectuated between connected portlets. At runtime, a property broker can match the data type of output properties from a source portlet with the data type of input properties from one or more target portlets coupled to the source portlet over separate wires. If a match is determined, the portlets are capable of sharing the property. The actual transfer of the property over the wire can be initiated through the use of a portlet wiring tool, or by establishing a click-to-action event for the source portlet as it is known in the art.

It will be apparent to the skilled artisan, then, that cooperatively interacting component based applications can be assembled through the selective wiring of different, selected components. Determining how components can cooperate with one another in a meaningful way, however, can be challenging. Furthermore, selecting an optimal combination of components for wiring also can be challenging. Finally, selecting an optimal wiring configuration for selected components can be even yet further challenging. Nevertheless, at present, selecting components for wiring is a purely manual exercise, rife with inefficiencies.

BRIEF SUMMARY OF THE INVENTION

Embodiments of the present invention address deficiencies of the art in respect to wiring components in a component based application and provide a novel and non-obvious method, system and computer program product for heuristically assembling components in a component based application. In one embodiment, a data processing system configured to assemble component based applications can include a component aggregation application including an application builder configured to assemble components into a component based application. The system further can include a property broker coupled to the component aggregation application and configured to apply a wiring scheme to selected components in a component based application. Finally, a collaborative heuristic integration matching engine (CHIME) can be coupled to the property broker and a data store of behaviorally derived data, the CHIME including program enabled to suggest components for assembly in a component based application based upon behaviorally derived data in the data store.

In one aspect of the embodiment, the behaviorally derived data can include a record of different components sharing mutual interactions in a component based application. In another aspect of the embodiment, the behaviorally derived data can include prior sets of assembled components. In yet another aspect of the embodiment, the behaviorally derived data can include prior wires created between a selected component and at least one other component. In even yet another aspect of the embodiment, the behaviorally derived data can include prior wiring schemes applied to prior sets of assembled components. Finally, in the behaviorally derived data further can include a lifespan for the prior sets of assembled components.

In another embodiment of the invention, a method for assembling components in a component based application can be provided. The method can include selecting a component for inclusion in a component based application, heuristically identifying at least one other component based upon the selected component, and recommending an assembly of the selected component and the at least one other component in the component based application. Heuristically identifying at least one other component based upon the selected component can include identifying at least one other component configured to process data for the selected component, or identifying a frequently assembled set of components associated with the selected component.

In another aspect of the embodiment, heuristically identifying at least one other component based upon the selected component further can include identifying a wiring pattern for components known to have previously experienced cooperative manual interaction. Likewise, in yet another aspect of the embodiment, heuristically identifying at least one other component based upon the selected component further can include identifying a frequently established wiring scheme for the selected component and other components in the component based application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for heuristically assembling components in a component based application. In accordance with an embodiment of the present invention, behavioral data in respect to the selection and wiring of components in previously assembled component based applications can be collected and leveraged thereafter to guide the selection and wiring of components in a contemporaneously assembled component based application. The use of the behavioral data can range from merely identifying compatible components for a selected component, to proposing optimal wiring arrangements among selected components. In this way, the assembly of a component based application can enjoy the benefit of prior assembly knowledge.

Figure 1:
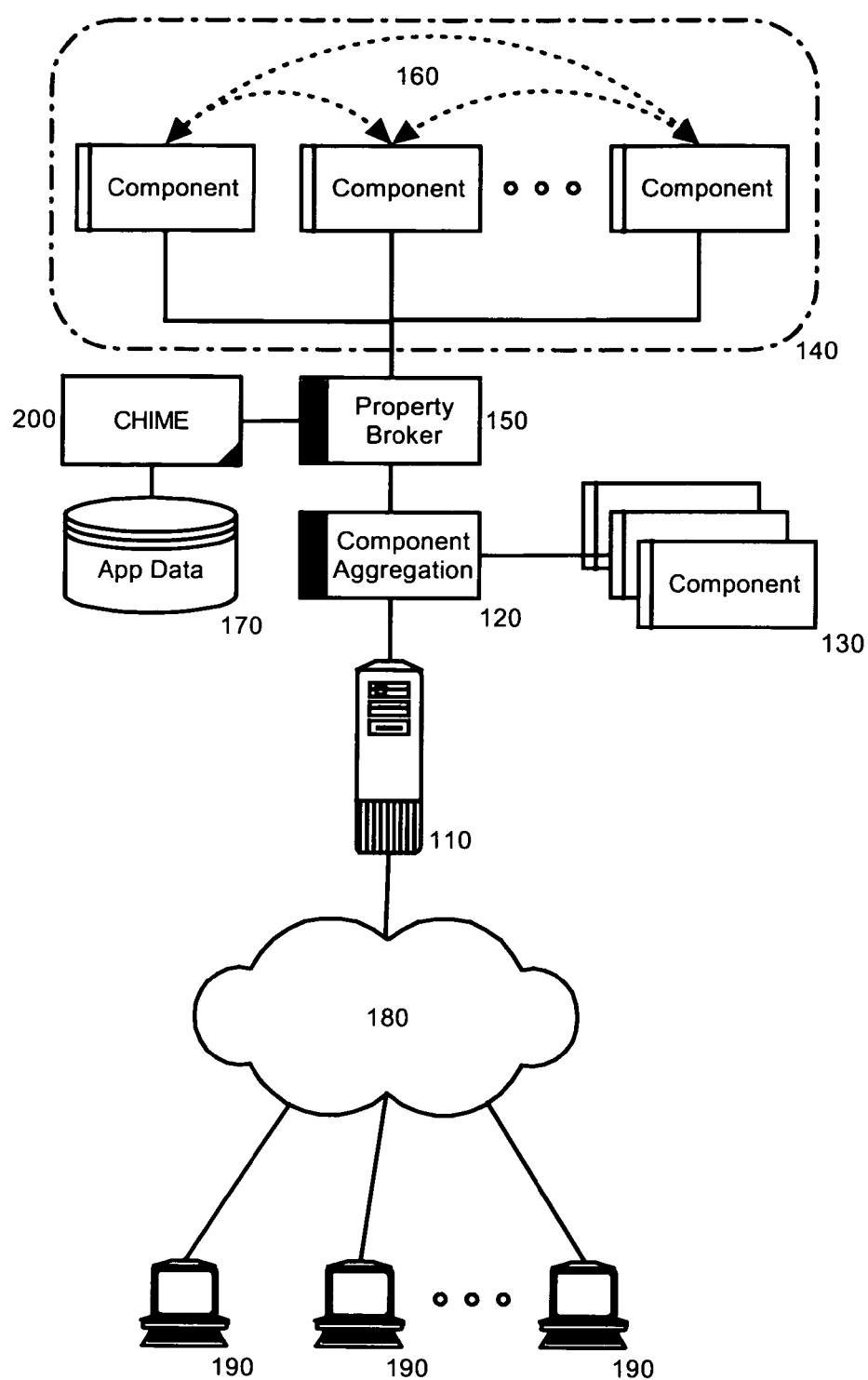
FIG. 1 is a schematic illustration of a data processing system for heuristically assembling components in a component based user application; and, FIG. 2 is a flow chart illustrating a process for heuristically assembling components in a component based user application in a portal environment.

In further illustration, FIG. 1 is a schematic illustration of a data processing system for heuristically assembling components in a component based user application. The data processing system can include a host computing platform 110 coupled to one or more client computing devices 190 over a computer communications network 180. The host computing platform 110 can include a component aggregation application 120, for example a portal server enabled to aggregate one or more components 130 into an aggregation 140. As another example, the aggregation application 120 can include a workplace server enabled to generate a collaborative environment 140 of different collaborative components 130, such as instant messengers, chat rooms, shared documents, and the like.

Notably, a wiring scheme 160 can be established for the components 130 of the aggregation 140 through a property broker 150 as it is well-known in the art. The wiring scheme 160 can permit the sharing of properties between source and target components wired together by the property broker 150. To facilitate in the selection and wiring of components 130 in the collaborative environment, a CHIME 200 can be coupled to the property broker 150. The CHIME 200 can include program code enabled to access behavioral data 170 for previously assembled components in order to proactively suggest the selection and wiring of components 130 to produce a component based application.

The behavioral data 170 can include usage data reflecting the manual interaction between two different ones of the components 130, the configuration of different ones of the components 130 to process the data input and output of other ones of the components 130, prior selection patterns of different ones of the components 130 and prior wiring patterns of different ones of the components 130. Several distinct levels of assistance can be provided by the CHIME 200 utilizing the behavioral data 170. In this regard, at the most basic level, the CHIME 200 can suggest the selection of a component among the components 130 based upon the suggested component's ability to handle the data input or output of an already selected one of the component 130. At the most advanced level, an entire pre-wired assembly of selected ones of the components 130 can be suggested based upon the most frequently selected ones of the components 130 for a selected one of the components 130, and the most frequently selected wiring arrangements for the assembly.

More specifically, in a first level of assistance, the CHIME 200 can match a selected one of the components 130 with other components 130 able to provide data processible in the selected one of the components 130. In a second level of assistance, the CHIME 200 can monitor manual interactions with the components 130 to detect the repeated selection of certain interactions with different ones of the components 130 indicating the desirability of the creation of a wire between the different ones of the components 130. In a third level of assistance, the most often sets of established wires can be suggested during component assembly.

The CHIME 200 can provide yet a fourth level of assistance. In the fourth level of assistance, component selection patterns can be determined for an entire set of the components 130 based upon historical selection patterns. Over time, changes in the selection of components 130 can result in changes in a recommended set of components 130. Finally, in even yet a fifth level of assistance, a complete pre-wired set of components 130 in an assembly can be suggested based upon recognized often wired sets of components 130. In this way, the CHIME 200 can be viewed as adaptable and self-learning.

Notably, the recommendations of the CHIME 200 can be driven by heuristically derived data. The heuristically derived data can include the length of life cycles for applications utilizing particular wiring patterns. Applications built from certain component sets having the particular wiring patterns, if viable, demonstrate longer useful lifespans while less viable patterns are found wanting and are discarded. User ratings or assessments provided through structured annotation by end users further can be helpful in determining desirable component sets and wiring patterns.

Figure 2:
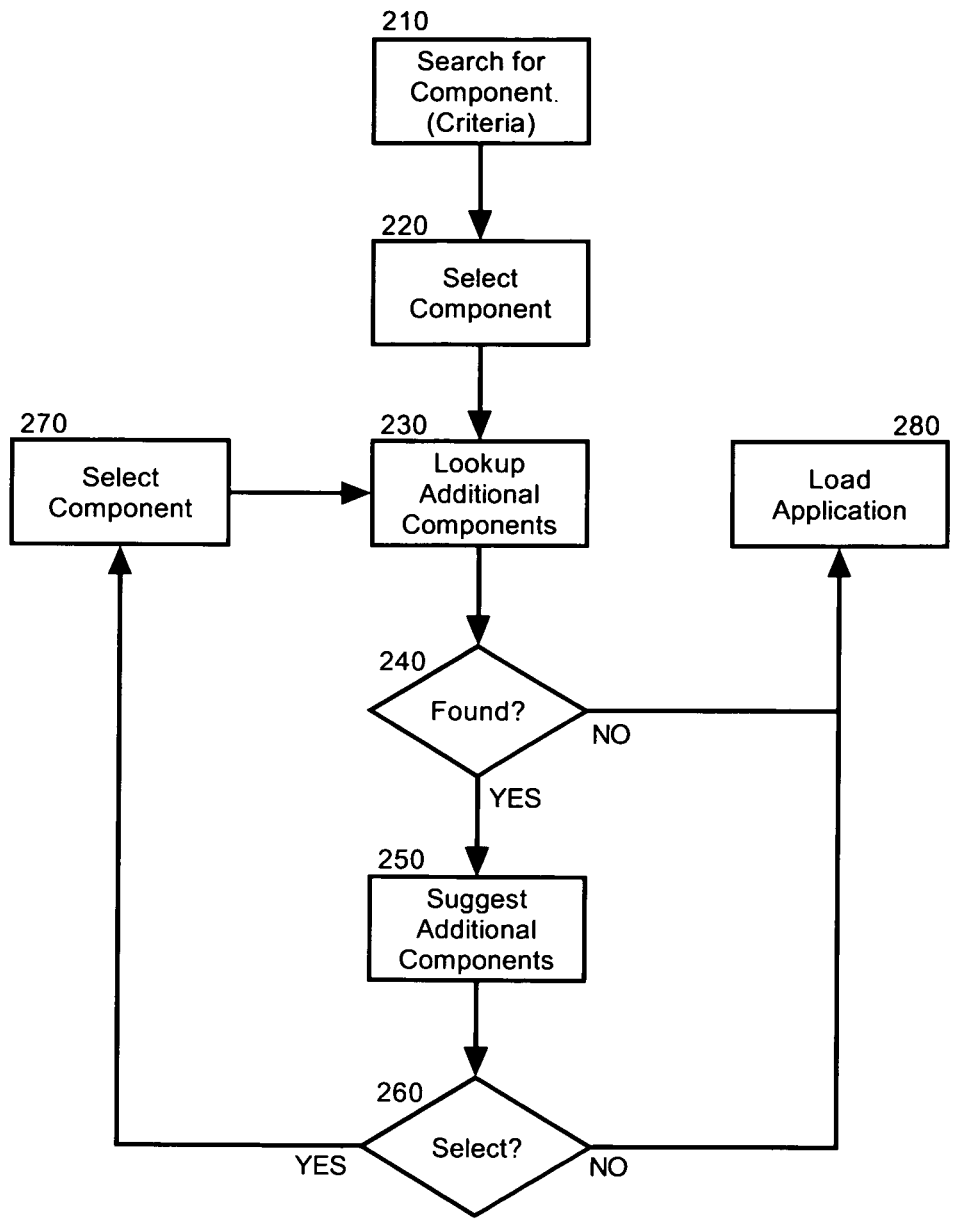

The recommendations of the CHIME 200 can be provided through an application builder (not shown) in which a set of components 130 can be selected for assembly and a wiring pattern can be applied to the components 130 in the set. The application builder can provide a user interface through which an administrator can manually assemble a component based application. In the course of assembling the component based application, the CHIME 200 can drive component selection and wiring recommendations through the application builder. In further illustration, FIG. 2 is a flow chart illustrating a process for heuristically assembling components in a component based user application in a portal environment.

Beginning in block 210, a selection interface can be provided through which a component can be located based upon provided criteria. The selection interface can range from a simple list to an advanced search form. In block 220, a component can be selected for inclusion in a component based application. Based upon the selection of the component, in block 230 additional components can be located which relate to the selected component. The additional components can be determined to relate to the selected component based upon a number of criteria which can range from mere compatibility for component data to heuristically derived data.

In decision block 240, if an additional component can be located, in block 250 the additional component can be suggested for inclusion in the component based application. It will further be recognized by the skilled artisan the location and suggestion of an additional component for a selected component represents only the tip of the iceberg. In fact, a wiring pattern also can be recognized, a complete set of components can be recognized, or an entire wired assembly of components can be recognized based upon the behaviorally derived data and the selected component.

In any event, in decision block 260, if the suggested component is selected for inclusion in the component based application, in block 270 the components can be selected for inclusion in the component based application and the process can repeat through block 230. In decision block 240, when no further components can be located for the selected component, in block 280 the completed component based application can be loaded for use.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented method for constructing a component based application, comprising:
   receiving a selection of a component for inclusion within the component based application;
   generating, based upon the selected component, a recommendation of an additional component for inclusion within the component based application;
   identifying, based upon the selected component and the additional component, a wiring scheme that aggregates the selected component and the additional component; and
   assembling the component based application using the selected component, the additional component, and the wiring scheme, wherein
   the recommendation of the additional component is based upon prior mutual interactions between the selected component and the recommended additional component in a previously-assembled component based application, and a match between data outputted from the selected component to data inputted into the recommended additional component, and wherein
   the identifying of the wiring scheme is based upon a stored previous length of a life cycle for other applications using the wiring scheme in previously-assembled component based applications.

2. The method of claim 1, wherein a complete set of components are recommended for inclusion within the component based application based upon the identified wiring scheme.

3. The method of claim 2, wherein the assembling includes the complete set of components.

4. The method of claim 1, wherein the recommendation of the additional component is based upon prior user assessments.

5. A computer hardware system configured to construct a component based application, comprising:
   a computer hardware processor, wherein the computer hardware processor is configured to initiate the following executable operations:
   receiving a selection of a component for inclusion within the component based application;
   generating, based upon the selected component, a recommendation of an additional component for inclusion within the component based application;
   identifying, based upon the selected component and the additional component, a wiring scheme that aggregates the selected component and the additional component; and
   assembling the component based application using the selected component, the additional component, and the wiring scheme, wherein
   the recommendation of the additional component is based upon prior mutual interactions between the selected component and the recommended additional component in a previously-assembled component based application, and a match between data outputted from the selected component to data inputted into the recommended additional component, and wherein the identifying of the wiring scheme is based upon a stored previous length of a life cycle for other applications using the wiring scheme in previously-assembled component based applications.

6. The system of claim 5, wherein a complete set of components are recommended for inclusion within the component based application based upon the identified wiring scheme.

7. The system of claim 6, wherein the assembling includes the complete set of components.

8. The system of claim 5, wherein the recommendation of the additional component is based upon prior user assessments.

9. A computer program product, comprising a hardware storage apparatus having stored therein computer usable program code, wherein the computer usable program code, which when executed by a computer hardware system, causes the computer hardware system to perform:

receiving a selection of a component for inclusion within the component based application;

generating, based upon the selected component, a recommendation of an additional component for inclusion within the component based application;

identifying, based upon the selected component and the additional component, a wiring scheme that aggregates the selected component and the additional component; and assembling the component based application using the selected component, the additional component, and the wiring scheme, wherein the recommendation of the additional component is based upon prior mutual interactions between the selected component and the recommended additional component in a previously-assembled component based application, and a match between data outputted from the selected component to data inputted into the recommended additional component, and wherein the identifying of the wiring scheme is based upon a stored previous length of a life cycle for other applications using the wiring scheme in previously-assembled component based applications.

10. The computer program product of claim 9, wherein a complete set of components are recommended for inclusion within the component based application based upon the identified wiring scheme.

11. The computer program product of claim 10, wherein the assembling includes the complete set of components.

12. The computer program product of claim 9, wherein the recommendation of the additional component is based upon prior user assessments.

* * * * *